(12) United States Patent
Sarsilmaz et al.

(10) Patent No.: US 11,562,269 B1
(45) Date of Patent: Jan. 24, 2023

(54) DISTRIBUTED CONTROL OF MULTIAGENT SYSTEMS WITH HETEROGENEITY IN SYNCHRONIZATION ROLES

(71) Applicant: University of South Florida, Tampa, FL (US)

(72) Inventors: Selahattin Burak Sarsilmaz, Tampa, FL (US); Tansel Yucelen, Tampa, FL (US); Tyler Ray Oswald, Louisville, CO (US)

(73) Assignee: University of South Florida, Tampa, FL (US)

( * ) Notice: Subject to any disclaimer, the term of this patent is extended or adjusted under 35 U.S.C. 154(b) by 525 days.

(21) Appl. No.: 16/530,301

(22) Filed: Aug. 2, 2019

Related U.S. Application Data

(60) Provisional application No. 62/740,023, filed on Oct. 2, 2018.

(51) Int. Cl.
*G06F 17/11* (2006.01)
*G06N 5/04* (2006.01)

(52) U.S. Cl.
CPC .............. *G06N 5/043* (2013.01); *G06F 17/11* (2013.01)

(58) Field of Classification Search
CPC . G06N 5/043; G06N 5/04; G06N 5/00; G06F 17/11; G06F 17/10; G06F 17/00
See application file for complete search history.

(56) References Cited

U.S. PATENT DOCUMENTS

| | | | |
|---|---|---|---|
| 2006/0235584 A1* | 10/2006 | Fregene | G05D 1/104 701/23 |
| 2013/0218365 A1* | 8/2013 | Caveney | G05D 1/0295 701/1 |
| 2017/0139423 A1* | 5/2017 | El Ferik | G05D 1/0088 |
| 2017/0227972 A1* | 8/2017 | Sabau | G08G 1/22 |

FOREIGN PATENT DOCUMENTS

CN 102393709 A 3/2012

OTHER PUBLICATIONS

Zheng et al. "Influence of Information Flow Topology on Closed-loop Stability of Vehicle Platoon with Rigid Formation", Oct. 8, 2014, IEEE 17th International Conference on Intelligent Transportation Systems (ITSC), pp. 2094-2100. (Year: 2014).*

Reinl et al. "Optimal Control of Multi-Vehicle-Systems Under Communication Constraints Using Mixed-Integer Linear Programming" , Oct. 15, 2007, ROBOCOMM 2007. (Year: 2007).*

Bansal et al. "Safe Sequential Path Planning of Multi-Vehicle Systems Under Presence of Disturbances and Imperfect Information", Mar. 16, 2016, Department of Electrical Engineering and Computer Sciences, University of California, Berkeley (Year: 2016).*

(Continued)

*Primary Examiner* — Mohamed Charioui
(74) *Attorney, Agent, or Firm* — Quarles & Brady LLP

(57) ABSTRACT

Disclosed is a multiagent system with agents in communication with each other via a communication network. The agents have heterogeneous time-invariant dynamics such that all of the agents have a primary set of synchronization roles that are different from a secondary set of synchronization roles of a subset of the agents.

7 Claims, 3 Drawing Sheets

(56) References Cited

OTHER PUBLICATIONS

Seyboth et al. "Cooperative control of linear multi-agent systems via distributed output regulation and transient synchronization", Feb. 22, 2016, Elsevier Ltd. pp. 132-139. (Year: 2016).*
Vidyasagar, M., "Chapter 6: Small-Gain Type Criteria for Lp-Stability," from "Input-Output Analysis of Large-Scale Interconnected Systems: Decomposition, Well-Posedness and Stability," 1981, pp. 105-132 (31 pages), Springer-Verlag.
Alvergue et al., Consensus Control for Heterogeneous Multi-Agent Systems, arXiv:1510.01946, Oct. 7, 2015, pp. 1-20.
Cai et al., The Adaptive Distributed Observer Approach to the Cooperative Output Regulation of Linear Multi-Agent Systems, Automatica, 2017, 75:299-305.
Huang et al., Cooperative Output Regulation of Heterogeneous Multi-Agent Systems: An H∞ Criterion, IEEE Transactions on Automatic Control, 2014, 59(1):267-273.
Khalil, Nonlinear Systems, Third Edition, Prentice Hall, 2002, pp. 204-211.
Li et al., Distributed Consensus of Linear Multi-Agent Systems with Adaptive Dynamic Protocols, Automatica, 2013, 49:1986-1995.
Lu et al., Cooperative Output Regulation of Linear Multi-Agent Systems by a Novel Distributed Dynamic Compensator, IEEE Transactions on Automatic Control, 2017, 62(12):6481-6488.
Lunze, Synchronization of Heterogeneous Agents, IEEE Transactions on Automatic Control, 2012, 57(11):2885-2890.
Peymani et al., H∞ Almost Output Synchronization for Heterogeneous Networks of Introspective Agents Under External Disturbances, Automatica, 2014, 50(4):1026-1036.
Sarsilmaz et al., Distributed Control of Multiagent Systems with Heterogeneity in Synchronization Roles, 2019 American Control Conference (ACC), Jul. 2019, pp. 102-107.
Sarsilmaz et al., A Distributed Control Approach for Heterogeneous Linear Multiagent Systems, International Journal of Control, 2021, 94(5):1402-1414.
Su et al., Cooperative Output Regulation of Linear Multi-Agent Systems, IEEE Transactions on Automatic Control, 2012, 57(4):1062-1066.
Su et al., Distributed Synchronization Control of Multi-Agent Systems with Switching Directed Communication Topologies and Unknown Nonlinearities, 2015 IEEE 54th Annual Conference on Decision and Control, 2015, pp. 5444-5449.
Wang et al., Distributed Control of Multi-Agent Systems with Major Agents and Markov Parameters, Proceedings of the 30th Chinese Control Conference, 2011, pp. 4835-4840.
Wieland et al., An Internal Model Principle is Necessary and Sufficient for Linear Output Synchronization, Automatica, 2011, 47(5):1068-1074.

* cited by examiner

DISTRIBUTED CONTROL OF MULTIAGENT SYSTEMS WITH HETEROGENEITY IN SYNCHRONIZATION ROLES

CROSS-REFERENCE TO RELATED APPLICATIONS

This application claims benefit of U.S. Provisional Application No. 62/740,023, filed Oct. 2, 2018, which is hereby incorporated herein by reference in its entirety.

STATEMENT REGARDING FEDERALLY SPONSORED RESEARCH OR DEVELOPMENT

This invention was made with government support CMMI1657637 awarded by the National Science Foundation. The Government has certain rights in the invention.

BACKGROUND

A multiagent system is a system of multiple interacting agents that can be used to perform tasks for solving a problem. The multiagent system can controlled via a centralized controller in direct communication with each of the agents or through a distributed control environment.

BRIEF DESCRIPTION OF THE DRAWINGS

The foregoing will be apparent from the following more particular description of example embodiments of the present disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION OF EMBODIMENTS

Figure 1A:
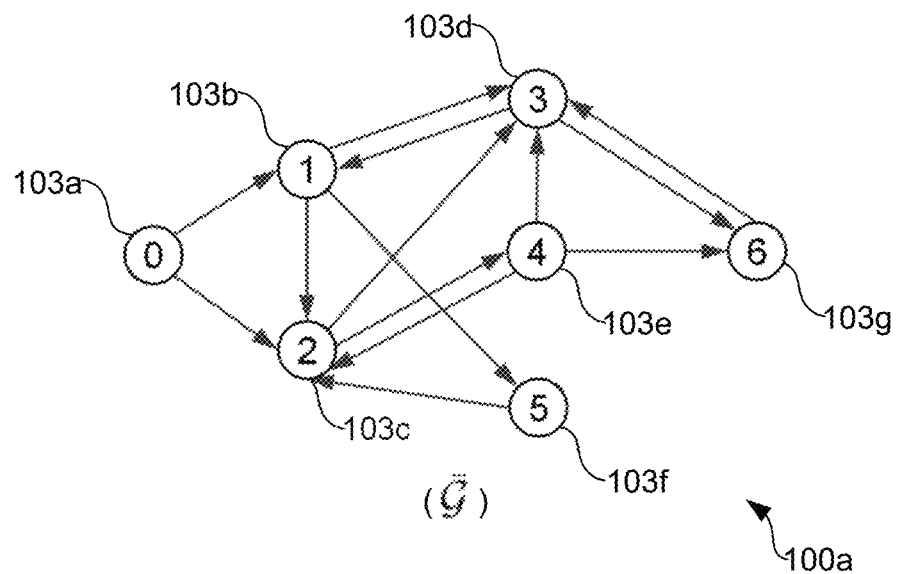
FIGS. 1A and 1B are example of multiagent systems according to various embodiments of the present disclosure.

The present disclosure relates to a distributed control system for heterogeneous linear time-invariant multiagent systems subject to external disturbances and a leader over fixed and directed communication graph topologies when they have a heterogeneity in their synchronization roles. A multiagent system of the present disclosure comprises multiple agents configured to communicate with and interact with each other via a directed communication graph topology. An agent can comprise a computer system configured to perform one or more tasks. An agent can comprise aerial vehicles, ground vehicles, autonomous vehicles, electrical vehicles, power systems in industrial process control (e.g., robotic assembly lines, etc.), and/or other types of systems that have individual tasks but are in communication with each other. Agents in a multiagent system can be homogeneous and/or heterogeneous. For example, homogenous agents are agents that all have the same dynamics. In contrast, heterogeneous agents are agents that have different dynamics (e.g., helicopter vs. ground vehicle). According to various embodiments, in a heterogonous system, the agents will need to work together to complete a task. As such, they will need to synchronize with each other to be able to work together.

The common output synchronization problem among all agents is generally considered in the heterogeneous multiagent systems literature. This is because of the heterogeneity in the dynamics and dimensions of agents, which does not allow for state synchronization. In addition to a common output of interest, some output variables of a proper subset of all agents can have the same physical meaning. Thus, these specific agents can generally be expected to achieve output synchronization not only for the common output but also for the additional output variables they have in common. This leads to the heterogeneity in synchronization roles problem. Inspired by this practical viewpoint, the present disclosure relates to a distributed control approach and its system-theoretical analysis for heterogeneous linear time-invariant multiagent systems, when agents have a heterogeneity in their synchronization roles.

Distributed control of heterogeneous multiagent systems, which are formed by networks of agents having non-identical dynamics and dimensions, has emerged as an attractive research direction in the last decade. In particular, the common output synchronization (regulation) problem of a network of heterogeneous (in dynamics and dimension) linear time-invariant systems is investigated for both the cases without and with a leader. For known methods considering the the common output synchronization problem, the common denominator is that the common output of all agents synchronize to a common trajectory. The common output synchronization is referred to as the primary synchronization role of multiagent systems. Thus, the traditional methods address the primary synchronization role of multiagent systems.

From a practical standpoint, however, some output variables of a proper subset of all agents can share the same physical meaning in addition to a common output of interest. As a consequence, the following question immediately arises: How do these specific agents achieve output synchronization not only for the common output but also for the additional output variables they have in common without deteriorating the common output synchronization of the remaining agents? The present disclosure provides systems and methods related to the answer of this question and addresses the secondary synchronization roles of multiagent systems.

Figure 1B:
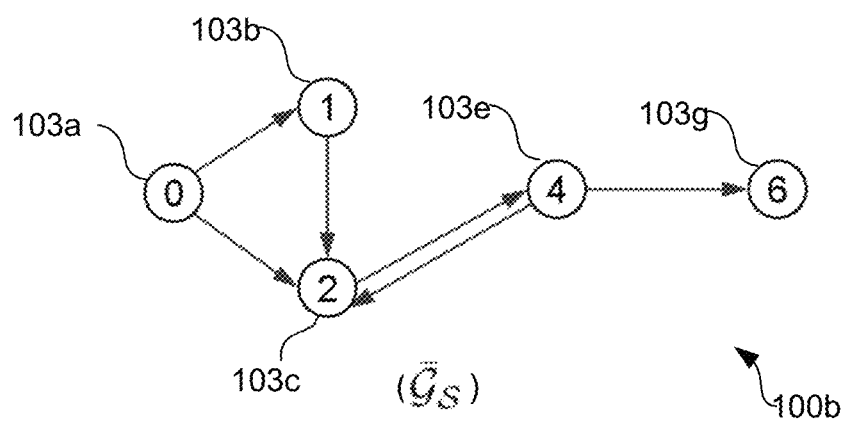

To elucidate one possible problem, consider, for example, a network of heterogeneous dynamical systems which consists of a leader and two different groups of follower agents. FIGS. 1A and 1B illustrate examples of multiagent systems 100 (e.g., 100a, 100b) comprising agents (e.g., 103a-103g) in communication via a communication network according to various embodiments of the present disclosure. Specifically, FIGS. 1A and 1B illustrate example heterogeneous multiagent systems 100 ($\overline{G}$ and $\overline{G}$ $\mathcal{N}$) with circles denoting the leader or the follower agents 103 (e.g., 103b-103g) and arrows denoting the directed edges corresponding to the physical coupling or the flow of information of each agent 103. In FIG. 1A, the circle labeled with 0 denotes the leader agent 103a, the circles labeled with 1, 2, 4, and 6 denote the first group of follower agents 103 (e.g., 103b, 103c, 103e, and 103g), and the circles labeled with 3 and 5 denote the second group of follower agents 103 (e.g., 103d, 103f). Outputs of (follower) agents 103 in the first (two dimensional) and the second (one dimensional) group are given by $[y_a(t), y_b(t)]^T \in \mathbb{R}^2$ and $y_a(t) \in \mathbb{R}$, respectively. If the trajectory of the leader 103a is given by $[y_a(t), y_b(t)]^T$, the primary synchronization role of the multiagent system 100 is the synchronization of $y_a(t)$ for all agents 100 to $y_a(t)$ of the leader 103a. Yet, there is a secondary synchronization role of this multiagent system 100; namely, the synchronization of $y_b(t)$ for the agents 103 in the first group to $y_b(t)$ of the leader.

For this problem, one potential remedy is to synchronize $[y_a(t), y_b(t)]^T$ of the agents 103 in the first group with $[y_a(t), y_b(t)]^T$ of the leader according to the graph $\bar{G}$ $\mathcal{N}$ in FIG. 1A and then synchronize $y_a(t)$ of the agents 103 in the second group with $y_a(t)$ of the agents 103 in the first group by considering only the edges from 1 to 3, 1 to 5, 2 to 3, 4 to 3, and 6 to 3 in the graph $\bar{G}$. By means of this cascade approach, one can utilize the existing results. However, this approach disregards the edges from 3 (agent 103d) to 1 (agent 103b), 3 (agent 103d) to 6 (agent 103g), and 5 (agent 103f) to 2 (agent 103c) in the graph $\bar{G}$; that is, the physical coupling or the flow of information $y_a(t)$ in the graph g is partially ignored. When this simplification is not possible, the problem becomes significantly more challenging since it cannot be divided into two cascade synchronization problems due to the adverse effects of the ignored edges on the synchronization of $[y_a(t), y_b(t)]^T$ for the agents 103 in the first group with $[y_a(t), y_b(t)]^T$ of the leader.

According to various embodiments, the present disclosure relates to heterogeneous linear time-invariant multiagent systems 100 with a leader when agents 103 have heterogeneity in their synchronization roles. To this end, a new definition of the linear cooperative output regulation problem is introduced in order to allow not only the primary output regulation but also a secondary output regulation in distributed control of networks of these nonidentical agents. In particular, the solvability of this problem with an internal model based distributed dynamic state feedback control law is first investigated based on a global condition. An agent-wise local sufficient condition is then presented under standard assumptions that paves the way for independent controller design for each agent 103.

Mathematical Preliminaries

A standard notation is used in the present disclosure. Specifically, $\mathbb{R}$, $\mathbb{R}^n$, and $\mathbb{R}^{n \times m}$ respectively, denote the sets of real numbers, n×1 real column vectors, and n×m real matrices; $1_n$ and $I_n$ respectively denote the n×1 vector of all ones and the n×n identity matrix; "$\triangleq$" denotes equality by definition. In addition, $(\bullet)^T$ is written for the transpose and $\|(\bullet)\|_2$ for the induced two norm of a matrix; $\sigma(\bullet)$ for the spectrum and $\rho(\bullet)$ for the spectral radius of a square matrix; $(\bullet)^{-1}$ for the inverse of a nonsingular matrix; $\otimes$ for the Kronecker product; and $\text{diag}(A_1, \ldots, A_n)$ for a block-diagonal matrix with matrix entries $A_1, \ldots, A_n$ on its diagonal. Finally, the space $\mathcal{L}_2$ is defined as the set of all piecewise continuous functions u: $[0, \infty) \to \mathbb{R}^m$ such that $$\|u(t)\|_{\mathcal{L}_2} = \left( \int_0^\infty \|u(t)\|_2^2 dt \right)^{1/2} < \infty.$$

The graph theoretical notation used in the present disclosure is discussed as follows. In particular, In particular, consider a fixed (e.g., time-invariant) directed graph G=($\mathcal{V}$, $\varepsilon$), where $\mathcal{V} = \{v_1, \ldots, v_N\}$ is a nonempty finite set of N nodes and $\varepsilon \subset \mathcal{V} \times V$ is a set of edges. Each node in $\mathcal{V}$ corresponds to a follower agent 103. There is an edge rooted at node $v_j$ and ended at $v_i$ (i.e., $(v_j, v_i) \in \varepsilon$) if and only if $v_i$ receives information from $v_j$. $\mathcal{A} = [a_{ij}] \in \mathbb{R}^{N \times N}$ denotes the adjacency matrix, which describes the graph structure; that is, $a_{ij} > 0 \Leftrightarrow (v_j, v_i) \in \varepsilon$ and $a_{ij}=0$ otherwise. Repeated edges and self loops are not allowed; that is, $a_{ii}=0$, $\forall i \in \mathcal{N}$ with $\mathcal{N} = \{1, \ldots, N\}$. The set of neighbors of node $v_i$ is denoted as $N_i = \{j \in \mathcal{V} \mid (v_j, v_i) \in \varepsilon\}$. The in-degree matrix is defined by $\mathcal{D} = \text{diag}(d_1, \ldots, d_N)$ with $d_i = \Sigma_{j \in N_i} a_{ij}$. A directed path from node $v_i$ to node $v_j$ is a sequence of successive edges in the form $\{(v_i, v_p), (v_p, V_q), \ldots, (v_r, v_j)\}$. A directed graph is said to have a spanning tree if there is a root node such that it has directed paths to all other nodes in the graph. A fixed augmented directed graph is defined as $\bar{G}=(\bar{\mathcal{V}}, \bar{\varepsilon})$, where $\bar{\mathcal{V}} = \{v_0, v_1, \ldots, v_N\}$ is the set of N+1 nodes, including leader node $v_0$ and all nodes in $\mathcal{V}$, and $\bar{\varepsilon} = \varepsilon \cup \varepsilon'$ is the set of edges with $\varepsilon'$ consisting of some edges in the form of $(v_0, v_i)$, $i \in \mathcal{N}$.

In addition, a proper subset of nodes $\mathcal{S} \subset \mathcal{V}$ is considered such that S includes all follower agents 103 that have the secondary synchronization role. Without loss of generality, the following index set is considered for $\mathcal{S}$: $\mathcal{N} \mathcal{S} = \{1, \ldots, N'\}$. $\mathcal{S}$ induces a subgraph with respect to G and this induced subgraph is given by $G \mathcal{S} = (\mathcal{S}, \varepsilon \mathcal{N})$, where $\varepsilon \mathcal{S} = \{(v_j, v_i) \in \varepsilon \mid v_j, v_i \in \mathcal{S}\}$. Following the foregoing paragraph, the adjacency and in-degree matrices are defined for $G \mathcal{S}$: $A \mathcal{S} = [a_{sij}] \in \mathbb{R}^{N' \times N'}$ denotes the corresponding adjacency matrix, where $a_{sij} > 0 \Leftrightarrow (v_j, v_i) \in \varepsilon \mathcal{S}$, $a_{sij}=0$ otherwise, and $D \mathcal{S} = \text{diag}(d_{s1}, \ldots, d_{sN'})$ with $d_{si} = \Sigma_{j \in N_i \cap \mathcal{N}} \mathcal{S} a_{sij}$ denotes the corresponding in-degree matrix. Finally, $\bar{\mathcal{S}} = \{v_0, v_1, \ldots, v_{N'}\}$ including leader node $v_0$ and all nodes in $\mathcal{V}$ that have the secondary synchronization role induces a subgraph with respect to $\bar{G}$ and this induced subgraph is given by $\bar{G} \mathcal{S} = (\bar{\mathcal{S}}, \bar{\varepsilon} \mathcal{S})$, where $\bar{\varepsilon} \mathcal{S} = \{(v_j, v_i) \in \bar{\varepsilon} \mid v_j, v_i \in \bar{\mathcal{S}}\}$ Definition 1. Given any square matrix $A_0$, a pair of matrices $(G_1, G_2)$ is said to incorporate a p-copy internal model of the matrix $A_0$ if $G_1$ and $G_2$ are given by $$G_1 = \text{diag}(\beta_1, \ldots, \beta_p), \quad G_2 = \text{diag}(\sigma_1, \ldots, \sigma_p), \tag{1}$$

where for $l=1, \ldots, p$, $\beta_l \in \mathbb{R}^{h_l \times h_l}$ and $\sigma_l \in R^{h_l}$ satisfy the following conditions: (i) The pair $(\beta_l, \sigma_l)$ is controllable and (ii) The minimal polynomial of $A_0$ is equal to the characteristic polynomial of $\beta_l$.

Problem Formulation

Heterogeneous Multiagent Systems Setup

According to various embodiments, the present disclosure relates to a multiagent system 100 of N (follower) agents 103 with heterogeneous linear time-invariant dynamics subject to unknown external disturbances over a fixed and directed communication graph topology g, where the dynamics of agent i is given by $$\dot{x}_i(t) = A_i x_i(t) + B_i u_i(t) + \delta_i(t), \quad x_i(0) = x_{i0}, \quad t \geq 0, \tag{2}$$

$$y_i(t) = C_i x_i(t) + D_i u_i(t), \tag{3}$$

with state $x_i(t) \in \mathbb{R}^{n_i}$, input $u_i(t) \in \mathbb{R}^{n_i}$, disturbance $\delta_i(t) \in \mathbb{R}^{n_i}$, and primary output $y_i(t) E \in \mathbb{R}^p$. In addition to the primary output of Equation (3), every agent 103 $i \in \mathcal{N}$ $\mathcal{N}$ has the following output equation $$y_{si}(t) = C_{si} x_i(t) + D_{si} u_i(t), \tag{4}$$

where $y_{si}(t) \in \mathbb{R}^{p_s}$ denotes the secondary output.

Consider now the exosystem given by $$\dot{\omega}(t) = A_0 \omega(t), \quad \omega(0) = \omega_0, \quad t \geq 0, \tag{5}$$

$$y_0(t) = R \omega(t), \tag{6}$$

$$y_{s0}(t) = R_s \omega(t), \tag{7}$$

$$\delta_i(t) = E_i \omega(t), \tag{8}$$

that generates trajectories of the leader agent 103 to be tracked and disturbances to be rejected by agents 103, where $\omega(t) \in \mathbb{R}^q$ is the exosystem state and $y_0(t) \in \mathbb{R}^p$ (respectively, $y_{s0}(t) \in \mathbb{R}^{p_s}$ is the trajectory of the leader agent 103 for the primary (respectively, secondary) synchronization role. It should be noted that this secondary synchronization role can be the prioritized (i.e., selected) one among multiple secondary roles.

Next, consider the primary tracking error and the secondary tracking error respectively given by $$e_i(t) \triangleq y_i(t) - y_0(t), \forall i \in \mathcal{N}, \tag{9}$$

$$e_{si}(t) \triangleq y_{si}(t) - y_{s0}(t), \forall i \in \mathcal{N}' \mathcal{N}. \tag{10}$$

As a consequence, the dynamics of each agent 103 and their corresponding tracking errors can be written as $$\dot{x}_i(t) = A_i x_i(t) + B_i u_i(t) + E_i \omega(t), x_i(0) = x_{i0}, t \geq 0, \tag{11}$$

$$e_i(t) = C_i x_i(t) + D_i u_i(t) - R\omega(t), \tag{12}$$

$$e_{si}(t) = C_{si} x_i(t) + D_{si} u_i(t) - R_s \omega(t). \tag{13}$$

If node $v_i$ observes the leader node $v_0$, then there exists an edge $(v_0, v_i)$ with weighting gain $k_i > 0$, otherwise $k_i = 0$. Thus, every agent 103 that observes the leader has access to the primary tracking error $e_i(t)$. If, in addition, it belongs to $\mathcal{N}' \mathcal{N}$, then it has access to the secondary tracking error $e_{si}(t)$. Moreover, each agent $i \in \mathcal{N}$ is assumed to have access to its own state $x_i(t)$ and the primary relative output error; that is, $y_i(t) - y_j(t)$ for all $j \in N_i$. Each agent $i \in \mathcal{N}' \mathcal{N}$ also has access to the secondary relative output error; that is, $y_{si}(t) - y_{sj}(t)$ for all $j \in N_i \cap \mathcal{N}' \mathcal{N}$. The primary local virtual tracking error for each agent $i \in \mathcal{N}$ is defined as $$e_{vi}(t) \triangleq \frac{1}{d_i + k_i} \left( \sum_{j \in N_i} a_{ij}(y_i(t) - y_j(t)) + k_i(y_i(t) - y_0(t)) \right). \tag{14}$$

In addition, the secondary local virtual tracking error for each agent $i \in \mathcal{N}' \mathcal{N}$ can be defined as $$e_{svi}(t) \triangleq \frac{1}{d_{si} + k_i} \left( \sum_{j \in N_i \cap \mathcal{N}_S} a_{sij}(y_{si}(t) - y_{sj}(t)) + k_i(y_{si}(t) - y_{s0}(t)) \right). \tag{15}$$

Finally, the distributed dynamic state feedback control law based on the available information to each agent is defined as $$u_i(t) = \begin{cases} K_{1i} x_i(t) + K_{2i} z_i(t) + K_{3i} z_{si}(t), \forall i \in N_s & \text{16(a)} \\ K_{1i} x_i(t) + K_{2i} z_i(t), \forall i \in N \backslash N_s, & \text{16(b)} \end{cases}$$

$$\dot{z}_i(t) = G_{1i} z_i(t) + G_{2i} e_{vi}(t), z_i(0) = z_{i0}, t \geq 0, \forall i \in N, \tag{17}$$

$$\dot{z}_{si}(t) = \tilde{G}_{1i} z_{si}(t) + \tilde{G}_{2i} e_{svi}(t), z_{si}(0) = z_{si0}, t \geq 0, \forall i \in N_s, \tag{18}$$

where $z_i(t) \in \mathbb{R}$ and $z_{si}(t) \in \mathbb{R}$ are the controller states and the septuple $(K_{1i}, K_{2i}, K_{3i}, G_{1i}, G_{2i}, \tilde{G}_{1i}, \tilde{G}_{2i})$ is specified below.

Considered Cooperative Output Regulation Problem

Definition 2. Given the system in Equations (5) and (11)-(13), and the fixed augmented directed graphs $\overline{G}$ and $\overline{G}$ $\mathcal{N}'$, find a distributed control law of the form of Equations (16a)-(18) such that: (i) The resulting closed-loop system matrix is Hurwitz; and (ii) For all $\omega_0$; $x_{i0}, z_{i0}, i \in \mathcal{N}$; and $z_{si0}, i \in \mathcal{N}' \mathcal{N}$; $\lim_{t \to \infty} e_i(t) = 0, \forall i \in \mathcal{N}$ and $\lim_{t \to \infty} e_{si}(t) = 0$, $\forall i \in \mathcal{N}' \mathcal{N}$.

To solve the problem defined above, the present disclosure makes the following assumptions.

Assumption 1. $A_0 \in \mathbb{R}^{q \times q}$ has no eigenvalues with negative real parts.

Assumption 2. The fixed augmented directed graph $\overline{G}$ has a spanning tree with the root node being the leader node.

Assumption 3. The fixed augmented directed graph $\overline{G}$ $\mathcal{N}'$ has a spanning tree with the root node being the leader node.

Assumption 4. The pair $(A_i, B_i)$ is stabilizable for all $i \in \mathcal{N}$.

Assumption 5. For all $\lambda \in \sigma(A_0)$, $$\text{rank} \begin{bmatrix} A_i - \lambda I_{n_i} & B_i \\ C_i & D_i \\ C_{si} & D_{si} \end{bmatrix} = n_i + p + p_s, \forall i \in \mathcal{N}_S. \tag{18}$$

Assumption 6. For all $\lambda \in \sigma(A_0)$, $$\text{rank} \begin{bmatrix} A_i - \lambda I_{n_i} & B_i \\ C_i & D_i \end{bmatrix} = n_i + p, \forall i \in \mathcal{N} \backslash \mathcal{N}_S. \tag{19}$$

Assumption 7. The pair $(G_{1i}, G_{2i})$ incorporates a p-copy internal model of $A_0$ for all $i \in \mathcal{N}$.

Assumption 8. The pair $(\tilde{G}_{1i}, \tilde{G}_{2i})$ incorporates a $p_s$-copy internal model of $A_0$ for all $i \in \mathcal{N}' \mathcal{N}$.

Solvability of the Problem

The foregoing investigates the solvability of the problem given in Definition 2. The approach is twofold. First, the property i) of Definition 2 is assumed and it is shown, under mild conditions, that this implies the property ii) of Definition 2. Second, an agent-wise local sufficient condition (i.e., distributed criterion) is provided for the property i) of Definition 2 (i.e., the stability of the closed-loop system matrix) under standard assumptions.

The following provides definitions that are used to express the closed-loop systems in their equivalent compact forms. Let $\Phi \triangleq \text{diag}(\Phi_1, \ldots, \Phi_N), \Phi = A, B, C, D, E$; $\Psi_l \triangleq \text{diag}(\Psi_{l1}, \ldots, \Psi_{lN}), \Psi = K, G, l = 1, 2; \tilde{G}_l \triangleq \text{diag}(\tilde{G}_{l1}, \ldots, \tilde{G}_{lN}), l = 1, 2; K_3 \triangleq \text{diag}(K_{31}, \ldots, K_{3N'}); \overline{\phi} \triangleq \text{diag}(\phi_1, \ldots, \phi_{N'}), \phi = B, D$ and $\psi_s \triangleq \text{diag}(\psi_{s1}, \ldots, \psi_{sN'}), \psi = C, D$. Furthermore, let $x(t) \triangleq [x_1^T(t), \ldots, x_N^T(t)]^T \in \mathbb{R}^{\bar{n}}, (t) \triangleq [z_1^T(t), \ldots, z_N^T(t)]^T \in \mathbb{R}^{\bar{n}_z}, z_s(t) \triangleq [z_{s1}^T(t), \ldots, z_{sN'}^T(t)] \in \mathbb{R}$, where $$\bar{n} = \sum_{i=1}^{N} n_i, \bar{n}_z = \sum_{i=1}^{N} n_{z_i}, \bar{n}_{z_s} = \sum_{i=1}^{N'} n_{z_{si}},$$

$$e(t) \triangleq [e_1^T(t), \ldots, e_N^T(t)]^T \in \mathbb{R}^{N_p},$$

$$e_v(t) \triangleq [e_{v1}^T(t), \ldots, e_{vN}^T(t)]^T \in \mathbb{R}^{N_p},$$

$$e_s(t) \triangleq [e_{s1}^T(t), \ldots, e_{sN}^T(t)]^T \in \mathbb{R}^{N' p_s},$$

$$e_{sv}(t) \triangleq [e_{sv1}^T(t), \ldots, e_{svN'}^T(t)]^T \in \mathbb{R}^{N' p_s}.$$

Finally, let $\omega_a(t) \triangleq 1_N \otimes \omega(t) \in \mathbb{R}^{Nq}, A_{0a} \triangleq I_N \otimes A_0, R_a \triangleq I_N \otimes R$, and $\overline{R}_{sa} \triangleq I_{N'} \otimes R_s$.

Observing $y_i(t)-y_j(t)=e_i(t)-e_j(t)$ and $y_{si}(t)-y_{sj}(t)=e_{si}(t)-e_{sj}(t)$, and recalling $d_i=\Sigma_{j\in N_i} a_{ij}$, $i \in \mathcal{N}$ and $d_{si}=\Sigma_{j\in N_i \cap \mathcal{N}_{\mathcal{S}}} a_{sij}$, $i \in \mathcal{N}'\mathcal{N}$, the expressions given by Equations (14) and (15) can be rewritten as $$e_{vi}(t) = e_i(t) - \frac{1}{d_i + k_i}\sum_{j\in N_i} a_{ij}e_j(t), \tag{21}$$

$$e_{svi}(t) = e_{si}(t) - \frac{1}{d_{si} + k_i}\sum_{j\in N_i \cap \mathcal{N}_S} a_{sij}e_{sj}(t), \tag{22}$$

respectively. Let $$\mathcal{F} \triangleq \mathrm{diag}\left(\frac{1}{d_1 + k_1}, \ldots, \frac{1}{d_N + k_N}\right),$$

$$\mathcal{F}_S \triangleq \mathrm{diag}\left(\frac{1}{d_{s1} + k_1}, \ldots, \frac{1}{d_{sN'} + k_{N'}}\right),$$

$$\mathcal{W} \triangleq (I_N - \mathcal{F}\mathcal{A}) \otimes I_p, \text{ and } \mathcal{W}_S \triangleq (I_{N'} - \mathcal{F}_S\mathcal{A}_S) \otimes I_{p_s}.$$

Here, it should be noted that $d_i+k_i>0$, $\forall i \in \mathcal{N}$ and $d_{si}+k_i>0$, $\forall i \in \mathcal{N}'\mathcal{N}$ by Assumption 2 and Assumption 3, respectively; hence, $\mathcal{F}$ and $\mathcal{F}\mathcal{N}$ are well-defined. From Equations (20) and (21), one can respectively write $$e_v(t)=\mathcal{W}e(t), \tag{23}$$

$$e_{sv}(t)=\mathcal{W}\mathcal{N}e_s(t) \tag{24}$$

Next, inserting Equations (16a) and (16b) into Equations (11) and (12), Equation (16a) into Equation (13), and using the above definitions, one can compactly write Equations (11), (16), (17), (12), and (13) as $$\dot{x}(t)=(A+BK_1)x(t)+BK_2z(t)+\tilde{B}K_3z_s(t)+E\omega_a(t), \, x(0)=x_0, \, t\geq 0, \tag{25}$$

$$\dot{z}(t)=G_1z(t)+G_2e_v(t), \, z(0)=z_0, \, t\geq 0, \tag{26}$$

$$\dot{z}_s(t)=\tilde{G}_1z_s(t)+\tilde{G}_2e_{sv}(t), \, z_s(0)=z_{s0}, \, t\geq 0, \tag{27}$$

$$e(t)=(C+DK_1)x(t)+DK_2z(t)+\tilde{D}K_3z_s(t)-R_a\omega_a(t), \tag{28}$$

$$e_s(t)=(C_s+D_sK_1)x(t)+D_sK_2z(t)+\overline{D}_sK_3z_s(t)-R_{sa}\omega_a(t), \tag{29}$$

where $\tilde{B}=[\overline{B}^T \ 0]^T$, $\tilde{D}=[\overline{D}^T \ 0]^T$, $C_s=[\overline{C}_s, \ 0]$, $D_s=[\overline{D}_s \ 0]$, and $R_{sa}=[\overline{R}_{sa} \ 0]$. Now, insert Equations (28) into Equation (23) (respectively, Equation (29) into Equation (24)) and replace the obtained expression with the one in Equation (26) (respectively, Equation (27)). Define $x_g(t) \triangleq [x^T(t), z^T(t), z_s^T(t)]^T \in \mathbb{R}$ and $e_g \triangleq [e^T(t), e_s^T(t)]^T \in \mathbb{R}^{Np+N'p_s}$. The closed-loop system given by Equations (11)-(18) then becomes $$\dot{x}_g(t)=A_gx_g(t)+B_g\omega_a(t), \, x_g(0)=x_{g0}, \, t\geq 0, \tag{30}$$

$$e_g(t)=C_gx_g(t)+D_g\omega_a(t), \tag{31}$$

where $$A_g = \begin{bmatrix} A + BK_1 & BK_2 & \tilde{B}K_3 \\ G_2\mathcal{W}(C + DK_1) & G_1 + G_2\mathcal{W}DK_2 & G_2\mathcal{W}\tilde{D}K_3 \\ \tilde{G}_2\mathcal{W}_S(C_s + D_sK_1) & \tilde{G}_2\mathcal{W}_SD_sK_2 & \tilde{G}_1 + \tilde{G}_2\mathcal{W}_S\overline{D}_sK_3 \end{bmatrix},$$

$$B_g = \begin{bmatrix} E \\ -G_2\mathcal{W}R_a \\ -\tilde{G}_2\mathcal{W}R_{sa} \end{bmatrix},$$

-continued $$C_g = \begin{bmatrix} C + DK_1 & DK_2 & \tilde{D}K_3 \\ C_s + D_sK_1 & D_sK_2 & \overline{D}_sK_3 \end{bmatrix},$$

$$D_g = \begin{bmatrix} -R_a \\ -R_{sa} \end{bmatrix}.$$

The next lemma plays a crucial role on the solvability of the problem, which is presented in Theorem 1 by assuming the property i) of Definition 2.

Lemma 1. Let Assumptions 1-3, 7, and 8 hold. If $A_g$ is Hurwitz, then the matrix equations $$X_gA_{0a}=A_gX_g+B_g, \tag{32}$$

$$0=C_gX_g+D_g, \tag{33}$$

have a unique solution $X_g$.

Theorem 1. Let Assumptions 1-3, 7, and 8 hold. If $A_g$ is Hurwitz, then the distributed dynamic state feedback control given by Equations (16a)-(18) solves the problem in Definition 2.

Proof. Under the given conditions, Equations (32) and (33) have a unique solution $X_g$ by Lemma 1. It now can be derived from Lemma 1.4 in J. Huang, Nonlinear Output Regulation, SIAM, 2004 (hereinafter "Huang") which is incorporated by reference in its entirety, that for all $\omega_0$; $x_{i0}$, $z_{i0}$, $i \in \mathcal{N}$; and $z_{si0}$, $i \in \mathcal{N}'\mathcal{N}$; $\lim_{t\to\infty}e_g(t)=0$.

Next, an agent-wise local sufficient condition that assures the property i) of Definition 2 (i.e., $A_g$ is Hurwitz) is derived under some standard assumptions. For now, let $\xi_i(t) \triangleq [x_i^T(t), z_i^T(t), z_{si}^T(t)]^T \in \mathbb{R}^{n_i+n_{z_i}+n_{z_{si}}}$, $\forall i \in \mathcal{N}_S$;

$\xi_i(t) \triangleq [x_i^T(t), z_i^T(t)]^T \in \mathbb{R}^{n_i+n_{z_i}}$, $\forall i \in \mathcal{N}/\mathcal{N}_S$;

$\mu_i(t) \triangleq \forall i \in \mathcal{N}$; and $$\mu_{si}(t) \triangleq \frac{1}{d_{si} + k_i}\sum_{j\in N_i \cap \mathcal{N}_S} a_{sij}(e_{sj}(t) + w_{sj}(t)), \forall i \in \mathcal{N}_S.$$

Here, $w_j(t) \in \mathbb{R}^p$ and $w_{sj}(t) \in \mathbb{R}^{p_s}$ are disturbances such that each agent $i \in \mathcal{N}$ can have access to the disturbed primary relative output error $y_i(t)-y_j(t)-w_j(t)$ for all $j \in N_i$ instead of $y_i(t)-y_j(t)$ and each agent $i \in \mathcal{N}'\mathcal{N}$ can have access to the disturbed secondary relative output error $y_{si}(t)-Y_{sj}(t)-w_{sj}(t)$ for all $j \in N_i \cap \mathcal{N}'\mathcal{N}$ instead of $y_{si}(t)-y_{sj}(t)$. Taking into account the disturbances $w_j(t)$ and $w_{sj}(t)$, the primary and the secondary local virtual tracking errors in Equations (14) and (15) are respectively written as $$e_{vi}(t)=e_i(t)-\mu_i(t), \tag{33}$$

$$e_{svi}(t)=e_{si}(t)-\mu_{si}(t). \tag{34}$$

The matrices for agent $i \in \mathcal{N}'\mathcal{N}$ are defined as $$A_{fi} \triangleq \begin{bmatrix} A_i + B_iK_{1i} & B_iK_{2i} & B_iK_{3i} \\ G_{2i}(C_i + D_iK_{1i}) & G_{1i} + G_{2i}D_iK_{2i} & G_{2i}D_iK_{3i} \\ \tilde{G}_{2i}(C_{si} + D_{si}K_{1i}) & \tilde{G}_{2i}D_{si}K_{1i} & \tilde{G}_{1i} + \tilde{G}_{2i}D_{si}K_{3i} \end{bmatrix},$$

$$\overline{B}_{fi} \triangleq \begin{bmatrix} 0 \\ -G_{2i} \\ 0 \end{bmatrix}, \overline{B}_{fsi} \triangleq \begin{bmatrix} 0 \\ 0 \\ -\tilde{G}_{2i} \end{bmatrix}, B_{fi} \triangleq [\overline{B}_{fi} \ \overline{B}_{fsi}],$$

-continued $$\overline{C}_{fi} \triangleq [C_i + D_i K_{1i} \quad D_i K_{2i} \quad D_i K_{3i}],$$

$$\overline{C}_{fsi} \triangleq [C_{si} + D_{si} K_{1i} \quad D_{si} K_{2i} \quad D_{si} K_{3i}],$$

and the matrices for agent $i \in \mathcal{N} \setminus \mathcal{N} \, \mathcal{N}$ as $$A_{fi} \triangleq \begin{bmatrix} A_i + B_i K_{1i} & B_i K_{2i} \\ G_{2i}(C_i + D_i K_{1i}) & G_{1i} + G_{2i} D_i K_{2i} \end{bmatrix},$$

$$B_{fi} \triangleq \begin{bmatrix} 0 \\ -G_{2i} \end{bmatrix}, \overline{C}_{fi} \triangleq [C_i + D_i K_{1i} \quad D_i K_{2i}].$$

At this point, consider Equations (11), (17), (18), (12), (13), (34), and (35) when $\omega(t) \equiv 0$. By inserting Equations (16a) and (16b) into the considered equations, one can write the dynamics of each agent and its tracking error(s) respectively as $$\dot{\xi}_i(t) = A_{fi} \xi_i(t) + B_{fi} \mu_i(t), \ \xi_i = \xi_{i0}, \ t \geq 0, \tag{36}$$

$$e_i(t) = \overline{C}_{fi} \xi_i(t), \tag{37}$$

$$e_{si}(t) = \overline{C}_{fsi} \xi_i(t), \tag{38}$$

where $\tilde{\mu}_i(t) = [\mu_i^T(t), \mu_{si}^T(t)]^T, \forall i \in \mathcal{N} \, \mathcal{N}, \tilde{\mu}_i(t) = \forall i \in \mathcal{N} \setminus \mathcal{N} \, \mathcal{N}$.

Let, in addition, $$\mathcal{F}_1 \triangleq \mathrm{diag}\left(\frac{1}{d_1 + k_1}, \ldots, \frac{1}{d_{N'} + k_{N'}}\right) \text{ and }$$

$$\mathcal{F}_2 \triangleq \mathrm{diag}\left(\frac{1}{d_{N'+1} + k_{N'+1}}, \ldots, \frac{1}{d_N + k_N}\right).$$

Partition $\mathcal{A}$ as $\mathcal{A} = [\mathcal{A}_1^T \, \mathcal{A}_2^T]^T$, where $\mathcal{A}_1 \in \mathbb{R}^{N' \times N}$ and $\mathcal{A}_2 \in \mathbb{R}^{(N-N') \times N}$. Define the following matrices: $A_f \triangleq \mathrm{diag}(A_{f1}, \ldots, A_{fN})$, $\overline{B}_f \triangleq \mathrm{diag}(\overline{B}_{f1}, \ldots, \overline{B}_{fN})$, $\overline{B}_{fs} \triangleq \mathrm{diag}(\overline{B}_{fs1}, \ldots, \overline{B}_{fsN'})$, $\tilde{B}_f \triangleq \mathrm{diag}(B_{fN'+1}, \ldots, B_{fN})$, $\overline{C}_f \triangleq \mathrm{diag}(\overline{C}_{f1}, \ldots, \overline{C}_{fN})$, $\overline{C}_{fs} \triangleq \mathrm{diag}(\overline{C}_{fs1}, \ldots, \overline{C}_{fsN'})$, $\tilde{C}_{fs} \triangleq [\overline{C}_{fs} \, 0]$, $$B_f \triangleq \begin{bmatrix} \overline{B}_f(\mathcal{F}_1 \mathcal{A}_1 \otimes I_p) & \overline{B}_{fs}(\mathcal{F}_S \mathcal{A}_S \otimes I_{ps}) \\ \overline{B}_f(\mathcal{F}_2 \mathcal{A}_2 \otimes I_p) & 0 \end{bmatrix}, C_F \triangleq \begin{bmatrix} \overline{C}_f \\ \tilde{C}_{fs} \end{bmatrix}.$$

Let $$\xi(t) \triangleq [\xi_1^T(t), \ldots, \xi_N^T(t)]^T \in \mathbb{R}^{\overline{n} + \overline{n}_z + \overline{n}_{zs}} \text{ and }$$

$$w \triangleq [W_1^T(t), \ldots, W_N^T(t) W_{s1}^T(t), \ldots, W_{sN}^T(T)]^T \in \mathbb{R}^{Np + N' p_s}.$$

Then, Equations (36)-(38) can be put into the compact form given by $$\dot{\xi}(t) = \tilde{A}_f \xi(t) + B_f w(t), \ \xi(0) = \xi_0, \ t \geq 0, \tag{39}$$

$$e_g(t) = C_f \xi(t), \tag{40}$$

where $\tilde{A}_f = A_f + B_f C_F$. By construction, it is clear that $A_g$ is similar to $\tilde{A}_f$; hence, they have the same eigenvalues.

By applying a version of the small gain theorem from Theorem 6.2.2.12 in M. Vidyasagar, Input-output Analysis of Large-Scale Interconnected Systems: Decomposition, Well-Posedness, and Stability. Springer-Verlag, 1981 (hereinafter "Vidyasagar") which is incorporated by reference in its entirety, one can derive the agent-wise local sufficient condition given by Equation (43) for $\mathcal{L}_2$ stability of the dynamics in Equations (39) and (40). To conclude from its input-output stability that $A_g$ is Hurwitz, the stabilizability and the detectability of the system of interest must be ensured. It is easy to see that if $A_f$ is Hurwitz, then the pair $(\tilde{A}_f, B_f)$ is stabilizable and the pair $(\tilde{A}_f, C_f)$ is detectable. Therefore, the stabilizability and the detectability of the dynamics given by Equations (39) and (40) are guaranteed if $A_{fi}$ is Hurwitz for all $i \in \mathcal{N}$.

Remark 1. For agent $i \in \mathcal{N} \, \mathcal{N}$, let $\overline{G}_{li} \, \mathrm{diag}(G_{li}, \tilde{G}_{li}), l=1, 2; \overline{K}_i \triangleq [K_{1i} \, K_{2i} \, K_{3i}]$; and $\overline{\psi}_i = [\psi_i^T \, \psi_{si}^T]^T, \psi = C, D$. Then, $A_{fi} = \overline{A}_i + \overline{B}_i \overline{K}_1$, where $$\overline{A}_i = \begin{bmatrix} A_i & 0 \\ \overline{G}_{2i} \overline{C}_i & \overline{G}_{1i} \end{bmatrix}, \overline{B}_i = \begin{bmatrix} B_i \\ \overline{G}_{2i} \overline{D}_i \end{bmatrix}.$$

Note that the pair $(\overline{G}_{1i}, \overline{G}_{2i})$ incorporates a $(p+p_s)$-copy internal model of $A_0$ under Assumptions 7 and 8. By Lemma 1.26 in Huang, Assumptions 4, 5, 7, and 8 ensure the stabilizability of the pair $(\overline{A}_i, \overline{B}_i)$ for all $i \in \mathcal{N} \, \mathcal{N}$. Thus, $\overline{K}_i$ can always be chosen such that $A_{fi}$ is Hurwitz for all $i \in \mathcal{N} \, \mathcal{N}$. Similarly, for agent $i \in \mathcal{N} \setminus \mathcal{N} \, \mathcal{N}$, let $\overline{K}_i \triangleq [K_{1i} \, K_{2i}]$. Then, $A_{fi} = \overline{A}_i + \overline{B}_i \overline{K}_i$, where $$\overline{A}_i = \begin{bmatrix} A_i & 0 \\ G_{2i} C_i & G_{1i} \end{bmatrix}, \overline{B}_i = \begin{bmatrix} B_i \\ G_{2i} D_i \end{bmatrix}.$$

Assumptions 4, 6, and 7 guarantee the stabilizability of the pair $(\overline{A}_i, \overline{B}_i)$ for all $i \in \mathcal{N} \setminus \mathcal{N} \, \mathcal{N}$ by Lemma 1.26 in Huang. Hence, it is always possible to find $\overline{K}_i$ such that $A_{fi}$ is Hurwitz for all $i \in \mathcal{N} \setminus \mathcal{N} \, \mathcal{N}$.

Let $g_i(s) = \overline{C}_{fi}(sI - A_{fi})^{-1} B_{fi}, \forall i \in \mathcal{N}$ and $g_{si}(s) = \overline{C}_{fsi}(sI - A_{fi})^{-1} B_{fi}, \forall i \in \mathcal{N} \, \mathcal{N}$. If $A_{fi}$ Hurwitz is made for all $i \in \mathcal{N}$, it can be concluded from Corollary 5.2 in H. K. Khalil, Nonlinear Systems, Prentice Hall, 2002 (hereinafter "Khalil") which is incorporated by reference in its entirety, for all $i \in \mathcal{N}$, the system given by Equations (36) and (37) is $\mathcal{L}_2$ stable with finite gain; and for all $i \in \mathcal{N} \, \mathcal{N}$, so is the system given by Equations (36) and (38). It follows from Theorem 5.4 in Khalil that the corresponding $\mathcal{L}_2$ gains of the systems are $$\gamma_i = \sup_{\omega \in \mathbb{R}} \|g_i(j\omega)\|_2 < \infty, \forall i \in \mathcal{N}, \tag{41}$$

$$\gamma_{si} = \sup_{\omega \in \mathbb{R}} \|g_{si}(j\omega)\|_2 < \infty, \forall i \in \mathcal{N}_S. \tag{42}$$

Let $\Gamma_1 \triangleq \mathrm{diag}(\gamma_1, \ldots, \gamma_{N'})$, $\Gamma_2 \triangleq \mathrm{diag}(\gamma_{N'+1}, \ldots, \gamma_N)$, $\Gamma_3 \triangleq \mathrm{diag}(\gamma_{s1}, \ldots, \gamma_{sN'})$, $\Gamma \triangleq (\Gamma_1, \Gamma_2, \Gamma_3)$.

The next theorem presents an agent-wise local sufficient condition for the problem introduced in Definition 2.

Theorem 2. Let Assumptions 2 and 3 hold, and $A_{fi}$ be Hurwitz for all $i \in \mathcal{N}$. If $$\rho(\Gamma)\beta(\mathcal{Q}) < 1, \tag{43}$$

then $A_g$ is Hurwitz, where $$\mathcal{Q} = \begin{bmatrix} \mathcal{F}_1 \mathcal{A}_1 & \mathcal{F}_S \mathcal{A}_S \\ \mathcal{F}_2 \mathcal{A}_2 & 0 \\ \mathcal{F}_i \mathcal{A}_1 & \mathcal{F}_S \mathcal{A}_S \end{bmatrix}.$$

Remark 2. The inequality given by Equation (43) is satisfied if and only if $\gamma_i \rho(Q) < 1$, $\forall i \in \mathcal{N}$ and $\gamma_{si} \rho(Q) < 1$, $\forall i \in \mathcal{N}\,\mathcal{N}$. Hence, it paves the way for independent controller design for each agent. In addition, if there were no secondary synchronization roles, the third row and the second column of $Q$ would not be required and the condition would become $\gamma_i \rho(\mathcal{F}\mathcal{A}) < 1$, $\forall i \in \mathcal{N}$.

Illustrative Numerical Example

To illustrate the efficacy of our contributions documented in the previous section, consider six agents with $$A_i = \begin{bmatrix} 0 & 1 & 0 & -0.5 \\ 0 & 2 & 1 & 0 \\ 0 & 0 & 0 & 1 \\ 0.2 & 0 & 0 & 0 \end{bmatrix}, B_i = \begin{bmatrix} 0 & 1 \\ 2 & 0 \\ 0 & -1 \\ 3 & 1 \end{bmatrix}, C_i = [1\ 0\ 0\ 0],$$

$$D_i = [0\ 1], C_{si} = [0\ 0\ 1\ 0], D_{si} = 0, i = 1, 2, 4, 6,$$

$$A_i = \begin{bmatrix} 0.1 & 1 \\ 0.5 & 0 \end{bmatrix}, B_i = \begin{bmatrix} -1 \\ 1 \end{bmatrix}, C_i = [1\ 0], D_i = -0.5, i = 3, 5.$$

In addition, consider an exosystem with $$A_0 = \begin{bmatrix} 0 & 1 & 0 & 0 \\ 0 & 0 & 0 & 0 \\ 0 & 0 & 0 & 0.5 \\ 0 & 0 & -0.5 & 0 \end{bmatrix},$$

$$R = [1\ 0\ 0\ 0], R_s = [0\ 0\ 1\ 0],$$

$$E_1 = \begin{bmatrix} 0.5 & 0 & 0 & 1 \\ 0 & -0.8 & 0.1 & 0 \\ 0 & 0 & 0.4 & -1 \\ -0.2 & 0 & 0 & 0 \end{bmatrix},$$

$$E_2 = \begin{bmatrix} 0 & 1 & -0.5 & 0 \\ 0 & 0 & 0 & 2 \\ -1 & -0.3 & 0 & 0 \\ 2 & 1 & 0 & -1 \end{bmatrix},$$

$$E_4 = \begin{bmatrix} 1 & 1 & 0 & 0 \\ 0 & 0 & 0 & 0 \\ -2 & 0 & 1 & -1 \\ 0 & 0 & 0 & 1 \end{bmatrix},$$

$$E_6 = \begin{bmatrix} 0 & 0 & 0 & 2 \\ 3 & 2 & 1 & 0 \\ 0 & 0.5 & 0 & 0 \\ 0 & 1 & 0 & 0 \end{bmatrix},$$

$$E_3 = \begin{bmatrix} 0 & -2 & 0 & 1 \\ 0.4 & 0 & 0.2 & 0 \end{bmatrix},$$

$$E_5 = \begin{bmatrix} 1 & -1 & 1 & -1 \\ -1 & 1 & -1 & 1 \end{bmatrix},$$

and the augmented directed graphs $\overline{G}$ and $\overline{G}\,\mathcal{N}$ shown in FIGS. 1A and 1B. In the simulations, each nonzero $a_{ij}$ and $a_{sij}$ is set to to 1 and $k_i = 100$, $i=1, 2$. Moreover, initial conditions for the exosystem and the agents are given by $\omega_0 = [0, 0.2, 1, -1]^T$, $x_{10} = [1, 0.6, 0, 0]^T$, $x_{20} = [-0.5, 0, -0.2, 0]^T$, $x_{30} = [-0.1, 0]^T$, $x_{40} = [0, 0, 0.2, 0.1]^T$, $x_{50} = [0, 0.1]^T$, $x_{60} = [-0.5, 0, 0, -0.1]^T$, and the controller states of all agents are initialized at zero. It should be noted that $\mathcal{N}\,\mathcal{N} = \{1, 2, 4, 6\}$.

With this setup, Assumptions 1-6 hold. In addition, with the following matrices $$G_{1i} = \begin{bmatrix} 0 & 1 & 0 & 0 \\ 0 & 0 & 1 & 0 \\ 0 & 0 & 0 & 1 \\ 0 & 0 & -0.25 & 0 \end{bmatrix}, G_{2i} = \begin{bmatrix} 0 \\ 0 \\ 0 \\ 1 \end{bmatrix}, \forall i \in \mathcal{N},$$

and $\tilde{G}_{1i} = G_{1i}$, $\tilde{G}_{2i} = G_{2i}$, $\forall i \in \mathcal{N}\,\mathcal{N}$, Assumptions 7 and 8 are also satisfied. Finally, with the following controller parameters $$K_{1i} = -\begin{bmatrix} 0.2671 & 21.0962 & -4.7667 & -9.9519 \\ 3.7818 & -7.8813 & 2.3770 & 4.8829 \end{bmatrix},$$

$$K_{2i} = -\begin{bmatrix} 0.3132 & 1.4882 & 3.2623 & 3.8043 \\ 0.9497 & 4.5627 & 9.5427 & 12.6600 \end{bmatrix},$$

$$K_{3i} = -\begin{bmatrix} -0.0300 & -0.5954 & 0.2250 & -5.5793 \\ 0.0099 & 0.1969 & -0.1051 & 1.9180 \end{bmatrix}, \forall i \in \mathcal{N}_S,$$

$$K_{1i} = -[163.8941\ 199.5744],$$

$$K_{2i} = -[0.0316\ 0.7889\ -0.4712\ 5.4435], \forall i \in \mathcal{N} \setminus \mathcal{N}_S,$$

$A_{fi}$ is Hurwitz for all $i \in \mathcal{N}$ and the condition given by (42) is satisfied. Thus, $A_g$ is Hurwitz by Theorem 2.

Figure 2:
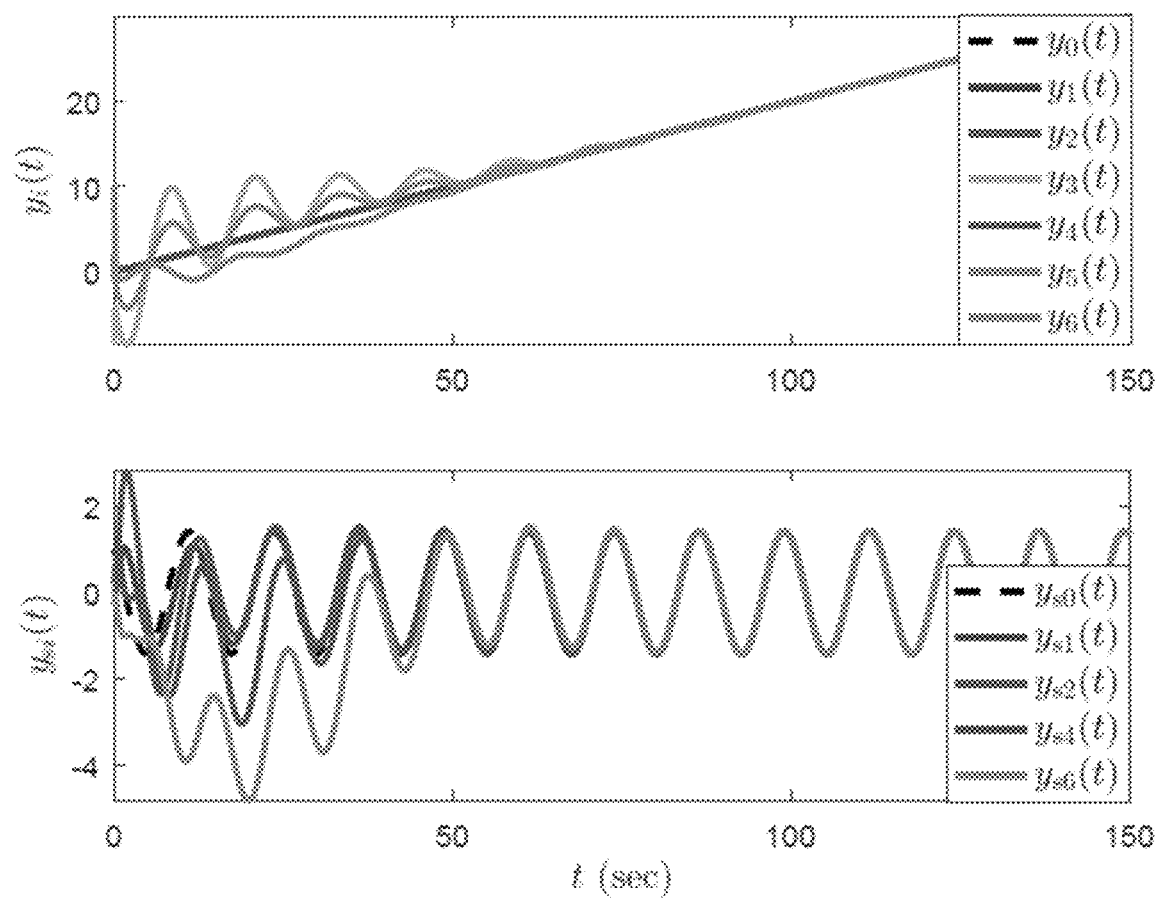
FIG. 2 is a graphical representation of the primary output responses of the agents in $\mathcal{N}$ and the secondary output responses of the agents in $\mathcal{N}$ $\mathcal{N}$ according to various embodiments of the present disclosure.

As is theoretically expected from Theorem 1, both the primary tracking error for all $i \in \mathcal{N}$ and the secondary tracking error for all $i \in \mathcal{N}\,\mathcal{N}$ converge to zero. This fact is numerically illustrated in FIG. 2, which illustrates example graphical representations showing the primary output responses of the agents in $\mathcal{N}$ and the secondary output responses of the agents in $\mathcal{N}\,\mathcal{N}$.

The present disclosure relates to heterogeneity in synchronization roles for networks of nonidentical linear time-invariant agents 103. In particular, the present disclosure relates to a distributed control approach for heterogeneous linear time-invariant multiagent systems 100 subject to external disturbances and a leader over fixed and directed communication graph topologies when they have a heterogeneity in their synchronization roles. Specifically, a new definition of the linear cooperative output regulation problem (Definition 2) allows both the primary output regulation and a secondary output regulation in distributed control of multiagent systems 100. For an internal model based distributed state feedback control law, the problem is solved based on a global condition (Theorem 1). An agent-wise local sufficient condition (Theorem 2) is also provided that paves the way for independent controller design for each agent 103.

Computing Device

Figure 3:
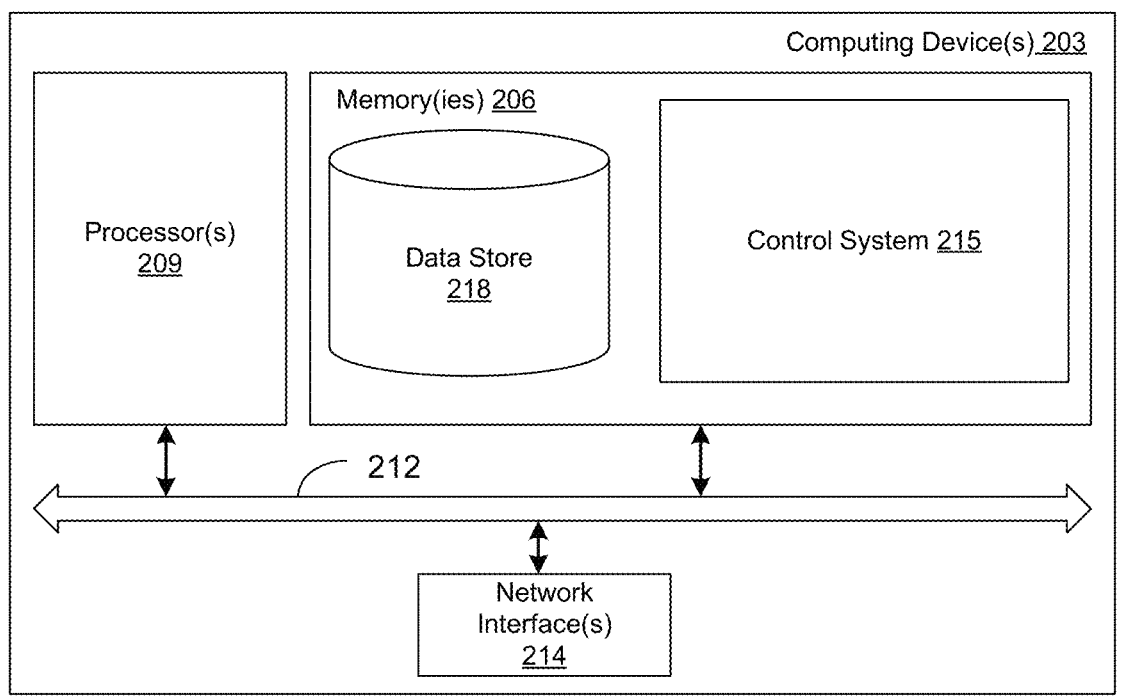
FIG. 3 is a schematic block diagram that provides one example illustration of a computing environment employed in the control system environment of each agent of FIG. 1 according to various embodiments of the present disclosure.

FIG. 3 shows a schematic block diagram of a computing device 203 employed in each agent 103 of the present disclosure. Each computing device 203 includes at least one processor circuit, for example, having a processor 209 and a memory 206, both of which are coupled to a local interface 212. The local interface 212 may comprise, for example, a data bus with an accompanying address/control bus or other bus structure as can be appreciated.

In some embodiments, the computing device 203 can include one or more network interfaces 214. The network interface 214 may comprise, for example, a wireless transmitter, a wireless transceiver, and/or a wireless receiver. The network interface 214 can communicate to a remote computing device, a ground station, a neighboring agent 103, and/or other components of the disclosed system using a Bluetooth, WiFi, or other appropriate wireless protocol. As one skilled in the art can appreciate, other wireless protocols may be used in the various embodiments of the present disclosure.

Stored in the memory 206 are both data and several components that are executable by the processor 209. In particular, stored in the memory 206 and executable by the processor 209 can be a control system 215, and potentially other applications. In this respect, the term "executable" means a program file that is in a form that can ultimately be run by the processor 209. The control system 215 is configured to implement the distributed control discussed herein for the primary synchronization role of multiagent systems. Also stored in the memory 206 may be a data store 618 and other data. In addition, an operating system may be stored in the memory 206 and executable by the processor 209. It is understood that there may be other applications that are stored in the memory 206 and are executable by the processor 209 as can be appreciated.

Examples of executable programs may be, for example, a compiled program that can be translated into machine code in a format that can be loaded into a random access portion of the memory 206 and run by the processor 209, source code that may be expressed in proper format such as object code that is capable of being loaded into a random access portion of the memory 206 and executed by the processor 209, or source code that may be interpreted by another executable program to generate instructions in a random access portion of the memory 206 to be executed by the processor 209, etc. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

The memory 206 is defined herein as including both volatile and nonvolatile memory and data storage components. Volatile components are those that do not retain data values upon loss of power. Nonvolatile components are those that retain data upon a loss of power. Thus, the memory 206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 209 may represent multiple processors 209 and/or multiple processor cores, and the memory 206 may represent multiple memories 206 that operate in parallel processing circuits, respectively. In such a case, the local interface 212 may be an appropriate network that facilitates communication between any two of the multiple processors 209, between any processor 209 and any of the memories 206, or between any two of the memories 206, etc. The local interface 212 may comprise additional systems designed to coordinate this communication, including, for example, performing load balancing. The processor 209 may be of electrical or of some other available construction.

Although the control system 215, and other various applications described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the control system 215, that comprises software or code can be embodied in any non-transitory computer-readable medium for use by or in connection with an instruction execution system such as, for example, a processor 209 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the control system 215, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 203, or in multiple computing devices in the same computing environment. To this end, each computing device 203 may comprise, for example, at least one server computer or like device, which can be utilized in a cloud based environment.

Additional aspects of the present disclosure can be better understood with reference to Sarsilmaz et al., Distributed Control of Multiagent Systems with Heterogeneity in Synchronization Roles, American Control Conference, 2019, which is hereby incorporated by reference in its entirety.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3% and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A multiagent control system, comprising:
a communication network; and
a plurality of agents having heterogeneous time-invariant dynamics such that all of the plurality of the agents operate based on a primary set of synchronization roles that are different from a secondary set of synchronization roles of a subset of the agents, the plurality of agents being in communication with one another via the communication network, the primary set of synchronization roles causing a primary common output of the plurality of agents to synchronize the plurality of agents to a primary common trajectory, the secondary set of synchronization roles causing a secondary common output of the subset of the plurality of agents to synchronize the subset of the plurality of agents to a secondary common trajectory, the plurality of agents comprising at least one of an aerial vehicle, a ground vehicle, an autonomous vehicle, an electrical vehicle, or a power system in an industrial process control environment,
wherein the dynamics for each agent is defined by $\dot{x}_i(t) = A_i x_i(t) + B_i u_i(t) + \delta_i(t)$, $x_i(0) = x_{i0}$, $t \geq 0$; $y_i(t) = C_i x_i(t) + D_i u_i(t)$; and $y_{si} = C_{si} x_i(t) + D_{si} u_i(t)$, where $x_i(t)$ is indicative of a state of agent i at time t, $u_i(t)$ is indicative of an input of the agent i at the time t, $\delta_i(t)$ is indicative of an disturbance of agent i at the time t, $y_i(t)$ is indicative of the primary common output of the agent i at the time t, $y_{si}(t)$ is indicative of the secondary common output of the agent i at the time t, the agent i is in the subset of the plurality of agents, and $C_i$ and $D_i$ are different from $C_{si}$ and $D_{si}$, respectively.

2. The multiagent control system of claim 1, wherein individual agents of the plurality of agents are subject to external disturbances.

3. The multiagent control system of claim 1, further comprising an external leader agent comprising its own dynamics, the external leader agent providing commands to the plurality of agents.

4. The multiagent control system of claim 1, wherein a particular agent is configured to exchange information with a neighboring agent, the information comprising position information.

5. The multiagent control system of claim 1, wherein the communication network corresponds to a fixed and directed communication graph topology.

6. The multiagent control system of claim 1, wherein each agent comprises a computing device and a control system executable in the computing device.

7. The multiagent control system of claim 1, wherein the plurality of agents are configured to achieve common output synchronization.

* * * * *